(No Model.)

A. B. SCHOFIELD.
FASTENING DEVICE.

No. 490,403. Patented Jan. 24, 1893.

Witnesses:—
O. H. Haynork
C. T. Sundgren

Inventor:—
Albert B. Schofield
by attorneys
Brown & Seward

UNITED STATES PATENT OFFICE.

ALBERT B. SCHOFIELD, OF BROOKLYN, NEW YORK.

FASTENING DEVICE.

SPECIFICATION forming part of Letters Patent No. 490,403, dated January 24, 1893.

Application filed July 25, 1892. Serial No. 441,136. (No model.)

*To all whom it may concern:*

Be it known that I, ALBERT B. SCHOFIELD, of Brooklyn, in the county of Kings and State of New York, have invented a new and useful Improvement in Fastening Devices, of which the following is a specification.

My invention relates to an improvement in fastening devices, and more particularly to devices for fastening and tightening the wires in connection with wire fences.

The object is to provide a combined fastener and tightener which may be furnished at a low cost and which may be employed at short intervals throughout the length of a continuous section of the wire to effectually prevent the latter from slipping at the posts and render it feasible to take up the slack between the posts without requiring any changing of parts or other than unskilled labor to operate it.

Figure 1:
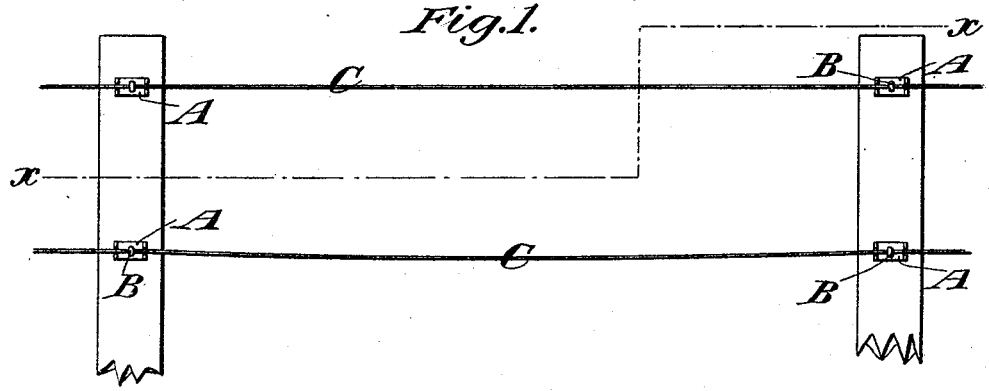
Figure 2:
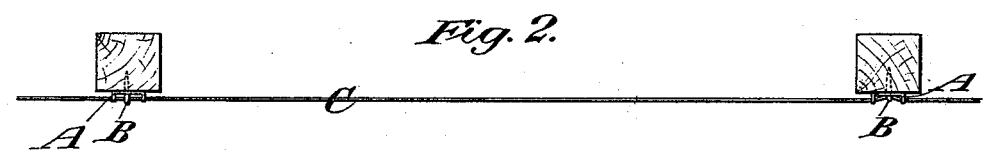
Figure 3:
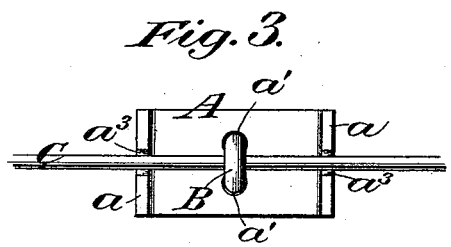
Figure 4:
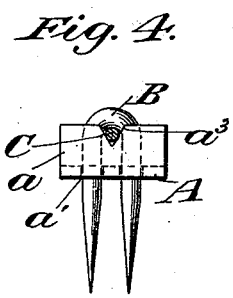
Figure 5:
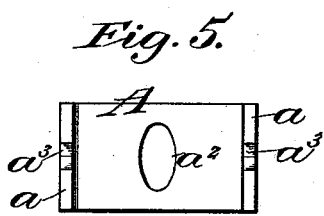
Figure 6:
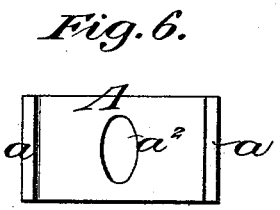

A practical embodiment of my invention is represented in the accompanying drawings in which, Figure 1 is a view of a portion of a wire fence in side elevation, showing one of the wires slack and the other tight, Fig. 2 is a top plan view, partly in section, on the line $x$, $x$ of Fig. 1, showing the position of the parts of the fastener in connection with the slack and with the taut wire, Fig. 3 is an enlarged face view of one of the fasteners, Fig. 4 is an end view of the same, Fig. 5 is a face view of one of the fasteners with a single staple opening, and Fig. 6 is a similar view showing the flanges at the ends of the fastener without notches.

The fastener consists of a plate A of iron, steel or other suitable material having outwardly turned flanges $a$ at its ends. The plate A is perforated at its central portion to receive a fastening staple B. There may be two perforations $a'$ formed, one for each prong of the staple, or a single perforation $a^2$, as shown in Figs. 5 and 6, may be formed, having sufficient length to admit both prongs of the staple. The outwardly turned flanges $a$ which preferably extend at substantially right angles to the body portion A serve as bearings for the wire, and, in the present form shown in Figs. 1 to 5 inclusive, the said flanges are each provided with a V shaped notch $a^3$ for the reception of the wire. The notches $a^3$ serve to cramp the wire between their converging walls and thereby act as an auxiliary grip in addition to the engagement of the staple.

The wire, denoted by C, when stretched across the flanges at the ends of the body of the fastener, may be secured by placing the staple B over it and driving the staple through the perforated plate A into the post. Slight pressure upon the wire intermediate of the flanges $a$ will be sufficient, in connection with the V shaped notches $a^3$, to securely hold the wire from slipping, and as the staple is driven farther into the post, the wire will be drawn over the flanged ends to supply the bend beneath the staple, and will thus become tightened between the posts. I find a single staple sufficient to hold both the wire and the plate in position, as the tension of the wire is exerted in a direction to hold the plate pressed against the post.

The device is adapted to use in tightening up the wires of fences which have already been built, as in building new fences, and, in connection with new fences, after the wire has been stretched nearly straight, in one long section, the above described fastening devices may be employed at intermediate points to complete the straightening of the wire.

In the form shown in Fig. 6, the notches in the flanges are omitted and the tension under the staple, as it bends the wire down between the flanges, is relied upon to hold it.

What I claim is:—

1. The fastening device comprising a bearing piece having bearings on its outer face for the reception of a wire, said bearing piece being further provided with an open space, intermediate of the bearings and back of the plane of the bearings, for the movement of the wire intermediate of the bearings toward the bearing piece support, and a staple adapted to engage the wire intermediate of the bearings and hold the wire to its bearings and the bearing piece to its support, substantially as set forth.

2. The fastening device comprising a plate having flanges turned at an angle to its face, the flanges provided with notches having converging sides for the reception of wire, and the plate being perforated intermediate of the flanges, and a staple adapted to embrace the wire intermediate of the flanges and pass through the perforated plate, substantially as set forth.

ALBERT B. SCHOFIELD.

Witnesses:
I. B. DECKER,
FREDK. HAYNES.